(12) United States Patent
Heidrich et al.

(10) Patent No.: US 8,839,558 B2
(45) Date of Patent: Sep. 23, 2014

(54) SEALING ASSEMBLY FOR A SWING DOOR

(71) Applicant: Wabtec Holding Corp., Wilmerding, PA (US)

(72) Inventors: Peter Heidrich, Des Plaines, IL (US); Frank Golemis, Skokie, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/007,063

(22) PCT Filed: Sep. 24, 2012

(86) PCT No.: PCT/US2012/056837
§ 371 (c)(1),
(2), (4) Date: Sep. 24, 2013

(87) PCT Pub. No.: WO2013/048935
PCT Pub. Date: Apr. 4, 2013

(65) Prior Publication Data
US 2014/0123558 A1 May 8, 2014

Related U.S. Application Data

(60) Provisional application No. 61/541,218, filed on Sep. 30, 2011.

(51) Int. Cl.
*E06B 7/21* (2006.01)
*B60J 5/06* (2006.01)
(52) U.S. Cl.
CPC ... *E06B 7/21* (2013.01); *B60J 5/062* (2013.01)
USPC .................. 49/306; 49/309; 49/310; 49/312; 49/470

(58) Field of Classification Search
USPC .......... 49/304, 306, 307, 309, 310, 311, 312, 49/315, 467, 469, 470, 197, 199
See application file for complete search history.

(56) References Cited

U.S. PATENT DOCUMENTS

| | | | | |
|---|---|---|---|---|
| 309,413 A | * | 12/1884 | Smith | 49/303 |
| 451,641 A | * | 5/1891 | Reed | 49/311 |
| 554,980 A | * | 2/1896 | Brown | 49/310 |
| 872,976 A | * | 12/1907 | Smith | 49/314 |
| 1,520,584 A | * | 12/1924 | Lundeen | 49/310 |
| 1,624,295 A | * | 4/1927 | Watkins | 49/312 |
| 1,912,561 A | * | 6/1933 | Williams | 49/314 |

(Continued)

FOREIGN PATENT DOCUMENTS

| | | |
|---|---|---|
| AU | 5417973 | 10/1974 |
| EP | 0579950 A1 | 1/1994 |

*Primary Examiner* — Katherine Mitchell
*Assistant Examiner* — Justin Rephann
(74) *Attorney, Agent, or Firm* — The Webb Law Firm

(57) ABSTRACT

A sealing assembly for sealing a gap between a swing door and a floor comprises a sealing member installed to be able to rotate from a closed position to an open position, an elastically deforming member made of an elastomer composition engaged to the sealing member, and a seal driving member to rotate the sealing member from the closed position to the open position when the door is opened. The elastically deforming member is deformed when the sealing member rotates from the closed position to the open position, and the sealing member returns from the open position to the closed position by elastic force of the elastically deforming member when the door is closed.

4 Claims, 5 Drawing Sheets

(56) References Cited

U.S. PATENT DOCUMENTS

| | | | | |
|---|---|---|---|---|
| 2,016,160 A | * | 10/1935 | Wierk | 49/310 |
| 2,813,315 A | * | 11/1957 | Menzies | 49/312 |
| 2,996,769 A | * | 8/1961 | Kunkel | 49/307 |
| 3,118,193 A | * | 1/1964 | Phiksland | 49/310 |
| 3,131,441 A | * | 5/1964 | Cornell | 49/480.1 |
| 3,263,366 A | * | 8/1966 | Woloohojian et al. | 49/314 |
| 3,302,334 A | * | 2/1967 | Totland | 49/312 |
| 3,706,162 A | * | 12/1972 | Werner | 49/312 |
| 4,058,191 A | * | 11/1977 | Balbo | 187/239 |
| 4,170,846 A | * | 10/1979 | Dumenil et al. | 49/303 |
| 4,348,836 A | * | 9/1982 | Dumenil et al. | 49/311 |
| 4,614,060 A | | 9/1986 | Dumenil et al. | |
| 8,468,746 B2 | * | 6/2013 | Salerno | 49/317 |
| 8,561,351 B2 | * | 10/2013 | Heidrich et al. | 49/312 |
| 2005/0121939 A1 | * | 6/2005 | Griffis et al. | 296/146.4 |
| 2007/0033875 A1 | * | 2/2007 | Griffis et al. | 49/308 |
| 2007/0039242 A1 | * | 2/2007 | Griffis et al. | 49/308 |
| 2010/0077671 A1 | * | 4/2010 | Salerno | 49/480.1 |
| 2011/0203180 A1 | | 8/2011 | Heidrich et al. | |

\* cited by examiner

SEALING ASSEMBLY FOR A SWING DOOR

BACKGROUND OF THE INVENTION

1. Field of the Invention

The present invention relates to a sealing assembly for sealing a gap between a door and a floor, in particular, a sealing assembly for sealing a gap between a swing door and a floor for transit vehicles.

2. Description of Related Art

Sealing assemblies for sealing a gap between a door and a floor are well-known in the art of transit vehicles in general, and buses in particular. For instance, sealing devices, such as rubber flaps are mounted on the bottom of the door to seal the gap for insulating the inside of the vehicles from the outside. In case of a swing door which opens inwardly to the vehicle, the sealing devices are arranged to move along the surface of the floor.

Lately, new types of transit vehicles employ a sloped floor for an improved transition between the ground level and the main floor portion, having a slope which begins at such portal aperture and elevates towards a main floor portion. In case of these vehicles, sealing devices for the swing door must accommodate such a sloped floor.

As shown in FIG. 5, one example of a conventional sealing assembly 100 for sealing the gap between the swing door 110 and the sloped floor 109 comprises a rigid structure 102 pivotally hinged about a horizontal axis, a rubber sealing surface 103 supported by the rigid structure 102, and metal torsion springs 104 installed around the axis. This rigid structure 102 pivots out of the way of the lower door arm 101 through contact with this same door arm 101 when the swing door 110 opens inwardly. When the door 110 closes, the rigid structure 102 is then returned to a closed position through gravity and repulsion force of the metal torsion springs 104.

However, the disadvantage of the metal springs 104 is that, being at the bottom of a door on a road-going vehicle, they are positioned in a potentially corrosive environment. This corrosive environment, therefore, greatly diminishes the metal springs' fatigue life and they can fall well before their intended design life.

SUMMARY OF THE INVENTION

In one embodiment, a sealing assembly for sealing a gap between a swing door and a floor comprises a sealing member installed to be able to rotate from a closed position to an open position, an elastically deforming member made of an elastomer composition engaged to the sealing member, and a seal driving member for rotating the sealing member to the open position when the door is opened. The elastically deforming member is deformed when the sealing member rotates from the closed position to the open position, and the sealing member returns from the open position to the closed position by elastic force of the elastically deforming member when the door is closed.

In one embodiment, the elastically deforming member may be positioned along a rotating axis of the sealing member and arranged to be twisted about the axis according to the rotation of the sealing member. One end portion of the elastically deforming member may be unrotatably installed, another end portion of the elastically deforming member may be unrotatably engaged to the sealing member, and a middle portion between both end portions may be able to be twisted according to the rotation of the sealing member.

In one embodiment, the elastically deforming member may be a torsion member and have an elongate axis about which it may twist. The elastically deforming member may be an elastic solid rod.

In one embodiment, the sealing member may have a cylindrical portion and may be installed rotatably about a center axis of the cylindrical portion, and the elastically deforming member may be installed in the cylindrical portion.

DESCRIPTION OF THE PREFERRED EMBODIMENTS

Figure 1:
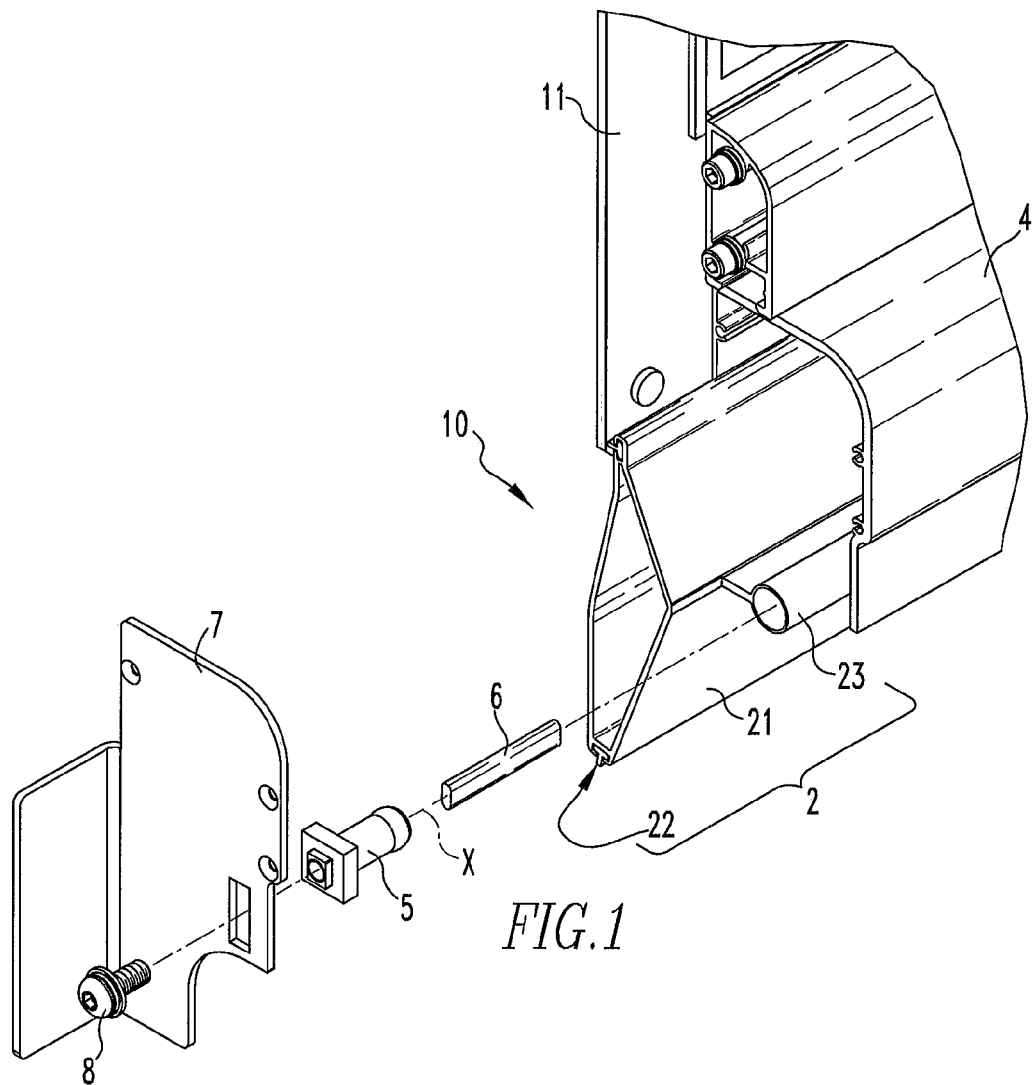
FIG. 1 is a partially exploded perspective view of a sealing assembly according to one embodiment of the present invention mounted on a bottom of a swing door.
Figure 2:
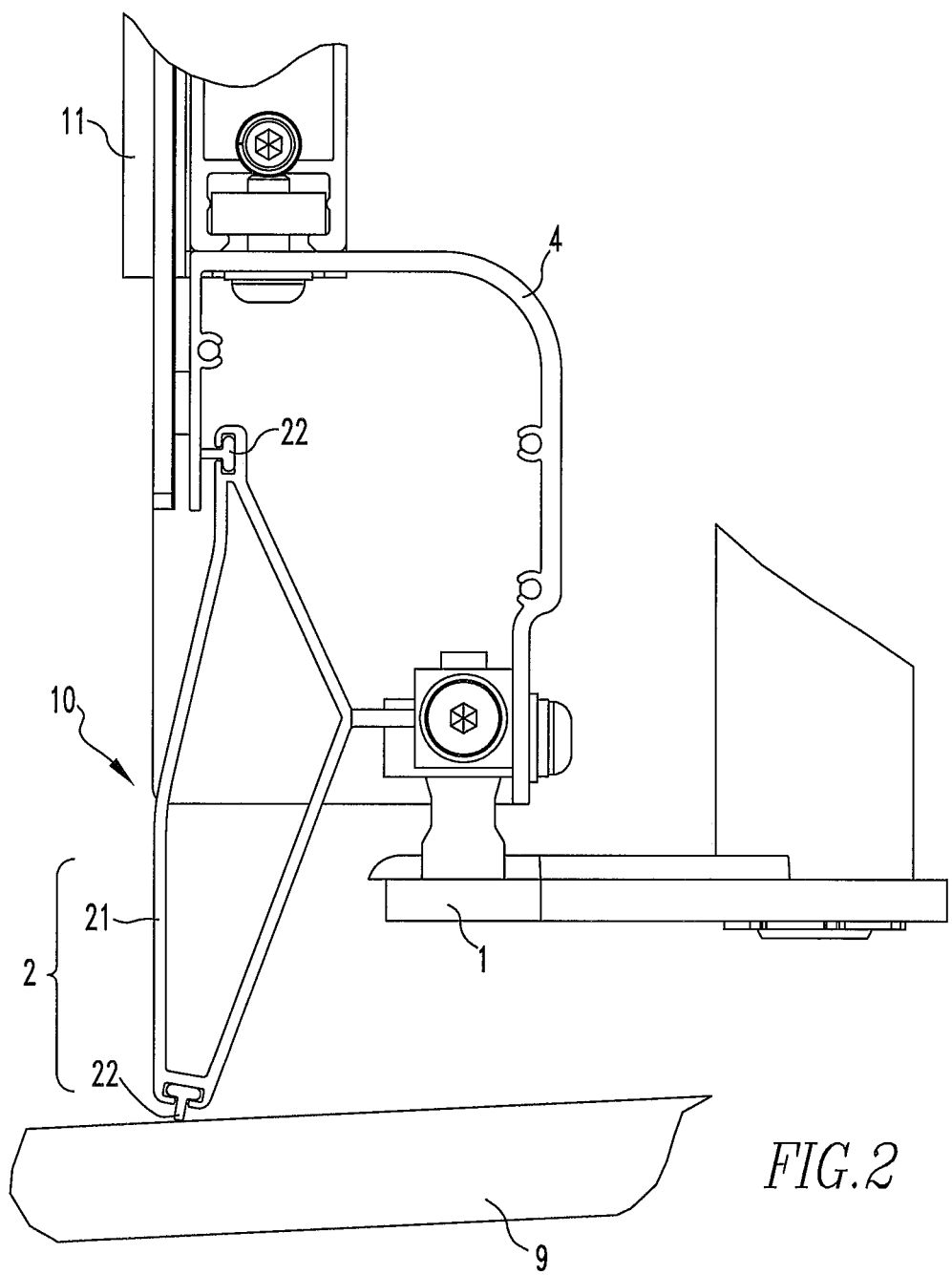
FIG. 2 is a cross-sectional view of the sealing assembly and the swing door of FIG. 1.

It is to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIGS. 1-4, one embodiment of a sealing assembly 10 installed to seal the gap between a swing door panel 11 and a floor 9, includes a bracket 4 fixed along a lower end of the inner side of the door panel 11, a sealing member 2 rotatably mounted on the bracket 4, and a torsion member 6 as an elastically deforming member.

The sealing member 2 is mounted to be able to rotate about a horizontal axis which extends parallel to the gap, from a closed position to an open position. The sealing member 2 comprises a rigid plate portion 21 elongated along the gap, and two seal strips 22, 22 fixed to the top and bottom of the rigid plate portion 21 along the longitudinal direction of the rigid plate portion 21. The sealing member 2 also has a cylindrical portion 23 having the horizontal axis X as a center axis thereof.

The torsion member 6 has an elongate axis about which it may twist. In this embodiment, the elongate axis of the torsion member is positioned on the horizontal axis X.

The bracket 4 has an L-shape in a cross-sectional view and is configured to cover the upper side and inward side (right side in FIG. 2) of the sealing member 2, and both longitudinal ends of the bracket 4 are closed by an end plate 7 (only one side is shown in FIG. 1).

The end plate 7 supports the sealing member 2 by a pivot pin 5 which is fixed to the end plate 7 by screw 8. More specifically, the tip of the pivot pin 5 is configured to be inserted into said cylindrical portion 23 of the sealing member 2 and hold the sealing member 2 rotatably about the axis X.

The pivot pin 5 has a hole 31 in it, which is configured to receive an end portion 6a of the torsion member 6 and engage to the end portion 6a unrotatably. In other words, the end portion 6a of the torsion member 6 is configured to be inserted into the hole 31 and is engaged unrotatably to the pivot pin 5. In the same manner, the cylindrical portion 23 has a hole 32 in it, which is configured to receive an end portion 6b of the torsion member 6, and engages to the end portion 6b unrotatably. In other words, the end portion 6b of the torsion member 6 is configured to be inserted into the hole 32 and is engaged unrotatably to the cylindrical portion 23.

Both holes 31, 32 are adjacent to each other and positioned apart from each other. Therefore, the torsion member 6 has a middle portion 6c between said end portions 6a, 6b, which is not inserted into said holes and is configured to be able to be twisted elastically.

Since said hole 31 is arranged in the tip portion of the pivot pin 5 and the hole 32 is arranged in the cylindrical portion 23 of the sealing member 2, as mentioned above and shown in FIG. 4, the whole body of the torsion member 6 is installed in a closed area surrounded by the cylindrical portion 23 and the pivot pin 5. In other words, the elastic torsion member 6 is sealed in a closed area when the door opens and closes.

The torsion member 6 of this embodiment can be made by any suitable elastomer compositions that are known in the art. For instance, the torsion member can be made from conventional rubber or polymer composition such as natural rubber or synthetic rubber.

Figure 3:
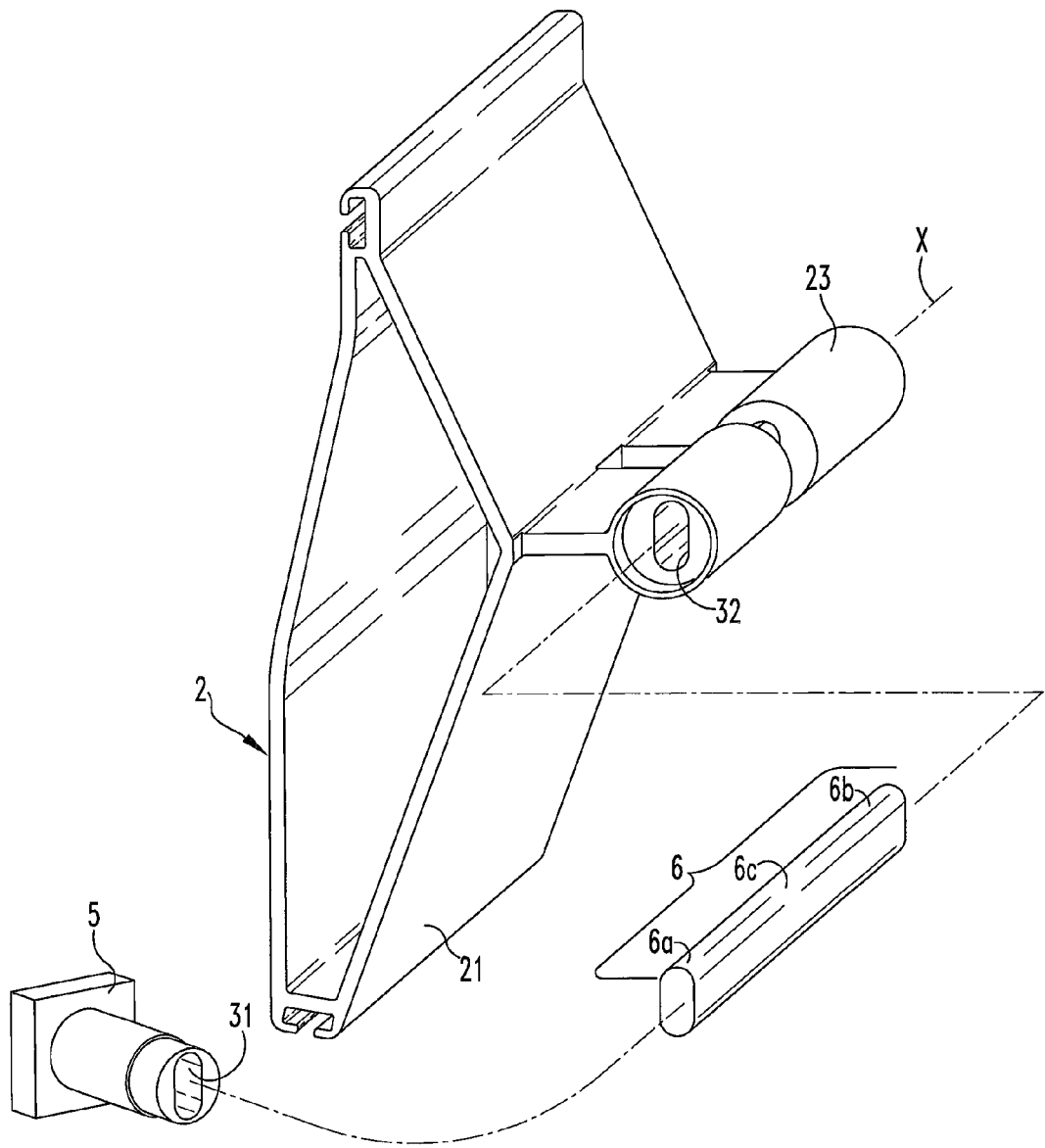
FIG. 3 is a partially exploded perspective view of a sealing assembly shown in FIG. 1.
Figure 4:
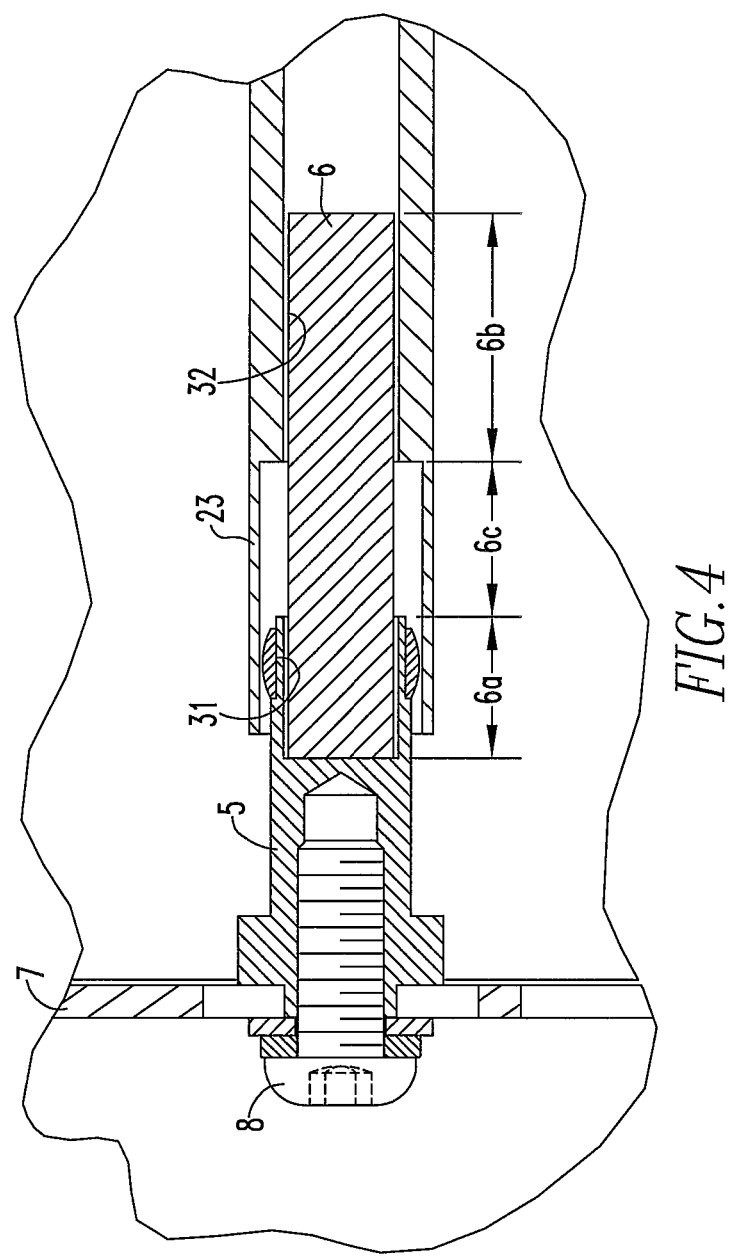
FIG. 4 is a partial cross-sectional view of the sealing assembly according to one embodiment of the present invention.
Figure 5:
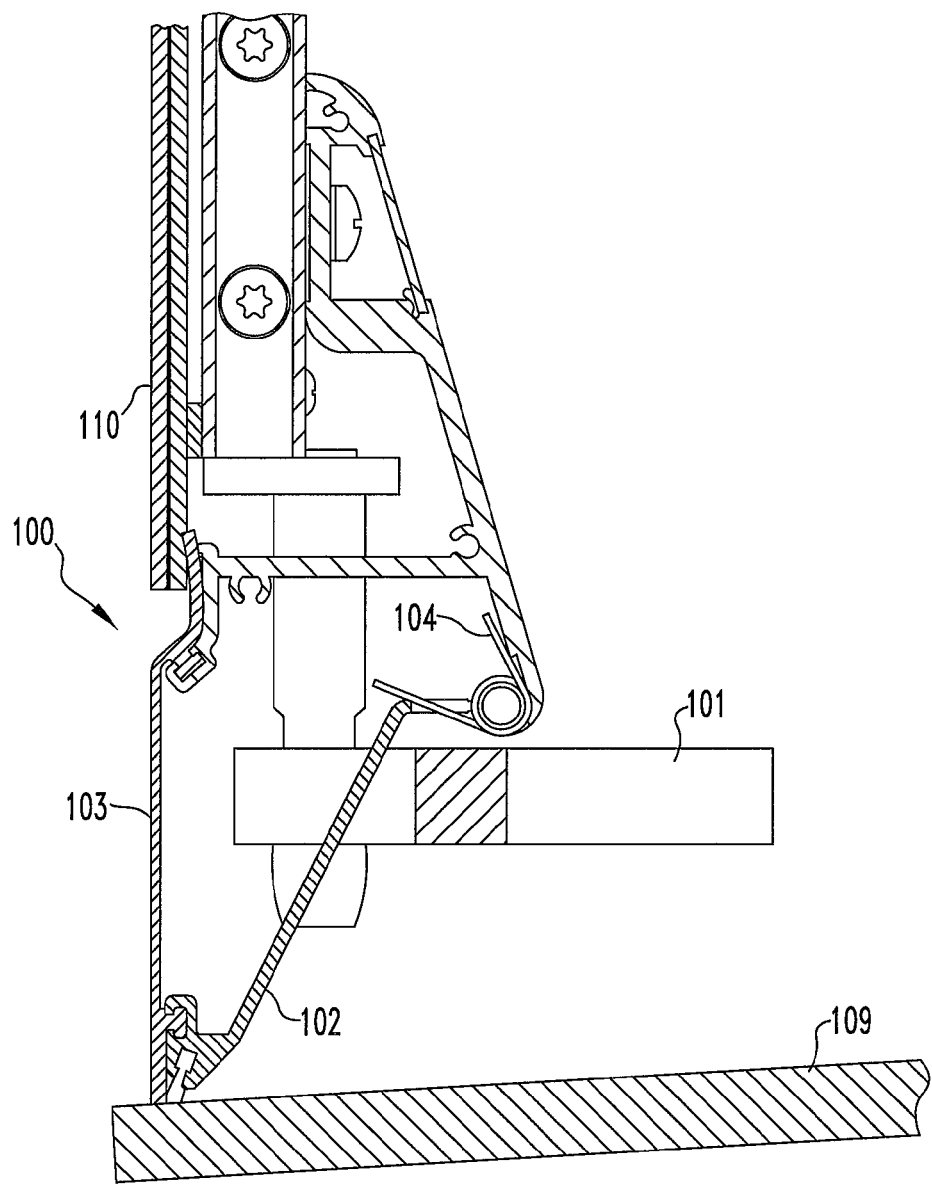
FIG. 5 is a cross-sectional view of an example of a conventional sealing assembly mounted on a bottom of a swing door.

The shape of the torsion member may be configured to be any suitable shape which may provide an elastic force to the sealing member 2. In the above embodiment, the torsion member 6 has an elongate axis about which it may twist and is shaped as a solid rod having a non-circular cross-sectional shape, so that it can engage to the holes 31 and 32. As shown in FIG. 3, one embodiment of the torsion member 6 is a flat bar-shaped solid rod.

The swing door in this embodiment has a lower door arm 1 which supports the door panel 11. In this embodiment, the lower door arm 1 works as a seal driving member which makes the sealing member rotate from the closed position to the open position. More specifically, the door arm 1 is arranged to contact the lower side of the rigid plate portion 21 of the sealing member 2 from inside of the door and push it up when the swing door is opened.

When the swing door is closed, the sealing member 2 positions at the closing position, and the seal strips 22 and 22 contact the floor 9 and the door panel 11, respectively. When the swing door opens inwardly, the rigid plate portion 21 of the sealing member 2 contacts the lower door arm 1, and is lifted and rotated upwardly to the open position about the center axis X through contact with the door arm 1. According to this rotation of the sealing member 2, one end portion 6b of the torsion member 6 inserted into the hole 32 of the cylindrical portion 23 rotates at the same angle as the sealing member 2. On the other hand, another end portion 6a of the torsion member 6 inserted into the hole 31 of the end plate 7 does not rotate and is held at the same angle. The middle portion 6c of the torsion member 6, therefore, is twisted according to the opening of the swing door and the rotation of the sealing member 2.

When the swing door is closed, the rigid plate portion 21 of the sealing member 2 is apart from the lower door arm 1 and rotates downwardly to the closed position by the restitutive force of the torsion member 6 and gravity of the sealing member 2.

In another embodiment of the present invention, the elastically deforming member can be configured to work as a compressing member which is compressed by the rotation of the sealing member, or a bending member which is bended by the rotation of the sealing member.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A sealing assembly for sealing a gap between a swing door which opens inwardly and a floor comprising:
   a sealing member pivotally hinged to the door about a horizontal axis adjacent the floor;
   the sealing member having a cylindrical portion positioned about said horizontal axis;
   an elastically deforming member made of an elastomer composition engaged in the cylindrical portion of the sealing member;
   a pivot pin fixed to said door and partially positioned for rotation in said cylindrical portion of said sealing member; and
   one end portion of the elastically deforming member unrotatably installed in said pivot pin and another end portion of the elastically deforming member unrotatably engaged to the sealing member, and a middle portion between both end portions able to be twisted according to the rotation of the sealing member,
   wherein the elastically deforming member enclosed by the cylindrical portion and the pivot pin is twisted about the horizontal axis when the sealing member rotates about the horizontal axis, and the sealing member returns from the open position to the closed position by elastic force of the elastically deforming member when the door is closed.

2. The sealing assembly according to claim 1, wherein the elastically deforming member positioned along a rotating axis of the sealing member and arranged to be twisted about the axis according to the rotation of the sealing member.

3. The sealing assembly according to claim 2, wherein the elastically deforming member is a torsion member and has an elongate axis about which it may twist.

4. The sealing assembly according to claim 3, wherein the elastically deforming member is an elastic solid rod.

* * * * *